United States Patent [19]
Smith

[11] Patent Number: 5,692,935
[45] Date of Patent: Dec. 2, 1997

[54] MATERIALS FOR PLASTIC FABRICS AND CLOTHING

[75] Inventor: W. Novis Smith, Philadelphia, Pa.

[73] Assignee: Lakeland Industries, Inc., Ronkonkoma, N.Y.

[21] Appl. No.: 576,772

[22] Filed: Dec. 21, 1995

Related U.S. Application Data

[63] Continuation-in-part of Ser. No. 276,203, Jul. 18, 1994, abandoned.

[51] Int. Cl.⁶ .................................................. B32B 27/00
[52] U.S. Cl. ........................... 442/38; 442/41; 442/394; 442/398; 2/69
[58] Field of Search ............................. 442/38, 41, 394, 442/398; 2/69

[56] References Cited

U.S. PATENT DOCUMENTS

| | | |
|---|---|---|
| 4,196,245 | 4/1980 | Kitson et al. ............. 428/198 |
| 4,284,444 | 8/1981 | Berstein et al. |
| 4,352,858 | 10/1982 | Stanley ....................... 428/423.1 |
| 4,647,497 | 3/1987 | Weeks . |
| 4,695,334 | 9/1987 | Mays . |
| 5,036,603 | 8/1991 | Dischler . |

OTHER PUBLICATIONS

Encyclopedia of Polymer Science and Engineering vol. 6 John Wiley & Sons, New York 1986, pp. 386–387.

*Primary Examiner*—Kathleen Choi
*Attorney, Agent, or Firm*—John Lezdey

[57] ABSTRACT

A heat sealable, adhesive-free material for plastic fabrics and clothing comprising the combination of a fabric scrim and a heat sealable coextruded film lamination which provides a barrier against solids, liquid and gases. The coextruded lamination comprises a film composition with an outer and inner layer of linear low density polyethylene and an intermediate layer of a polyamide polymer.

16 Claims, 2 Drawing Sheets

1

MATERIALS FOR PLASTIC FABRICS AND CLOTHING

This is a CIP of application Ser. No. 08/276,203, filed continuation Jul. 18, 1994, now abandoned.

FIELD OF THE INVENTION

The present invention relates to heat sealable materials for plastic fabrics and clothing for use in hazardous environments. More particularly, the invention is concerned with lightweight heat sealable materials in combination with fabrics comprising an inner and outer film layer of polyethylene and an intermediate film layer of a polyamide polymer, and clothing or articles made therewith.

BACKGROUND OF THE INVENTION

Protective clothing and containers of many types is well known for many and varied uses including protection from fire, vapors and harmful substances. Such clothing is often seen in suits for industrial workers, firemen, hazardous waste workers, race car drivers, airplane pilots and military personnel. Garments include not only complete hermetic suits, but also individual components such as trousers, jackets, gloves, boots, hats, head coverings, masks, etc. Industry always strives to provide better protection to the worker in hazardous environments.

Moreover, regulations restricting exposure to hazardous environments of various kinds, such as those contained in the Occupational Safety and Health Act, make it increasingly necessary to have better and more effective kinds of protective clothing. In particular, certain requirements by the U.S. Coast Guard and related requirements by other U.S. government agencies involve a total protective hermetic suit or envelope around the individual person to protect the worker from the widest possible range of hazardous materials.

Encapsulating suits are necessary for "immediately dangerous to life and health" (IDLH) environments. These suits must be air tight and worn with a self-contained breathing apparatus. The suit must be nonabsorbent, totally impermeable, and resistant to the widest range of chemicals and reagents. It should also be as fire resistant as possible. Since these suits are being worn by active individuals, they should also be flexible, abrasion resistant, lightweight, and should maintain their impermeability while being used. Such suits are commonly called "HAZ MAT" suits with class A level being the most vapor proof.

The garments presently available are almost invariably of thick construction and heavy in weight, and are often fabricated at least in part from materials impermeable to water or water vapor, such as natural and synthetic rubbers and elastomers, chlorinated rubbers, etc.

Protective clothing comprised of laminates of films have the problem of forming kinks when bent. This restricts motion and makes movement cumbersome. Moreover, most protective clothing is porous and provides little protection against hazardous chemical vapors.

It is therefore desirable to utilize an impermeable fabric which possesses heat sealing properties, good flexibility and is resistant to a large range of substances.

U.S. Pat. No. 4,569,088 to Frankburg et al describes a protective garment for protection from high temperatures and occasional splashes of molten metal. The fabric comprises an inner fabric layer of a fibrous polyamide and surface layers of polytetrafluoroethylene fibers. However, the fabric is porous and does not provide any protection against hazardous vapors.

U.S. Pat. No. 2,840,881 describes fibrous structures comprised of a surface layer of nonwoven, intermingled polytetrafluoroethylene fibers and another layer of fibers other than polytetrafluoroethylene fibers. The structures are useful when a lubricating surface is required.

In order to maximize the impermeability of the fabric against all chemical substances and vapors, the plastic films used must be no less than 2.0 mils thick. Additionally, the film itself must be without pin holes, fibers or porosity which lessen the barrier resistance of the actual film. Laminating the continuously formed film to a fabric gains the strength of the woven fabric without interfering with barrier properties of the film. It enhances the flexibility and resistance to failure from flexing of the total laminated fabric. Because of the absolute failsafe requirements of these chemical protective suits and for ease of putting the suit on or taking it off, a second layer of film is also used to form a sandwich. This maximizes the flexibility of a given construction with the total plastic film barrier being split into two layers and being easier to flex than one thick layer.

SUMMARY OF THE INVENTION

In accordance with the present invention, a novel solid, liquid and gas resistant film material is employed for clothing, including raincoats and protective clothing, boots, containers, etc. The film material comprises a coextrusion of an outer and inner film layer of a linear low density polyethylene and an intermediate layer of a polyamide polymer. Preferably, the polyethylene has a softening point of about 250°–350° F. The film material is both water and chemical resistant. The film material is advantageously bonded to a fabric or scrim so as to form a fabric which can be manufactured into a garment. Advantageously, the substrate fabric weighs between about one and four ounces per square yard and the film layer has a thickness of about 2–3 mils.

Other objects and a fuller understanding of the invention will be had by referring to the following description and claims taken in conjunction with the accompanying drawings.

DESCRIPTION OF THE PREFERRED EMBODIMENTS

Figure 1:
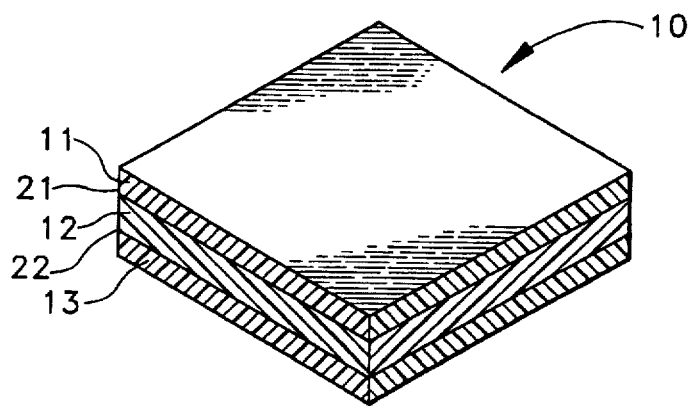
FIG. 1 is a exploded sectional view of the coextrusion or film laminate of the invention.

Although specific terms are used in the following description for the sake of clarity, these terms are intended to refer only to the particular structure of the invention selected for illustration in the drawings, and are not intended to define or limit the scope of the invention.

As shown in FIG. 1, there is provided a film laminate 10 comprising an outer film layer 11 and an inner film layer 13 consisting of a linear low density polyethylene coextruded with an intermediate film layer 12 consisting of a polyamide polymer, preferably nylon. The film laminate 10 has a thickness of at least 2 mils, preferably not thicker than 3 mils, and most preferably 2.5 mils to obtain suitable protection against chemical breakthrough at a low weight.

The film laminate 10 is held together by thin tie or adhesive layers 21 and 22. Polyacrylics like ACRYSOL are effective adhesion layers. Thin tie layers, in contrast to adhesion layers, go through a melt phase. Consequently, thin tie layers are often the adhesive of choice for bonding dissimilar materials (e.g. polar to nonpolar) to each other. Examples of thin tie layers include ethylene vinyl acetate (EVA), NUCREL and PRIMACOR.

Figure 2:
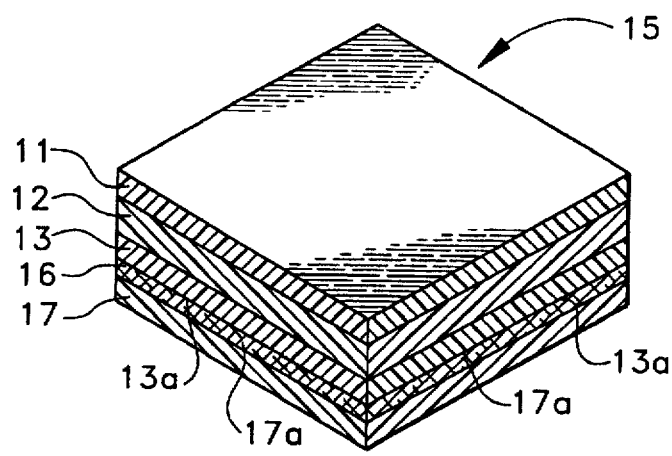
FIG. 2 is a sectional view illustrating the fabric of the invention.
Figure 3:
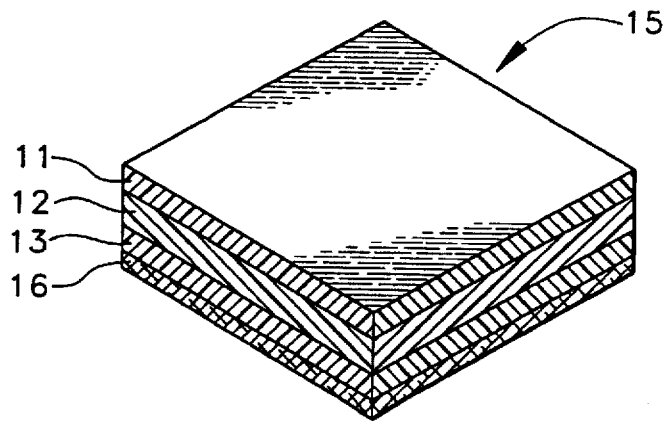
FIG. 3 is a sectional view illustrating an alternative film laminate of the invention.

FIGS. 2 and 3 show a material 15 which is formed with the film laminate 10 of FIG. 1. The material 15 comprises a top layer 11 of linear low density polyethylene coextruded or bonded with a polyamide polymer 12 which in turn is coextruded or bonded with a further layer 13 of linear low density polyethylene. A hot melt polymer layer or standard adhesive should be used to bond the film laminate 10 to the substrate scrim 16. The film laminate 10 is advantageously fusion bonded to a scrim 16 of a non-woven, woven or knitted fabric 16 which preferably comprises a high tensile strength material.

As illustrated in FIG. 2, fusion bonding by heat and pressure or ultrasonic bonding with added molten low density polyethylene or ethylene vinyl acetate (EVA) causes the polyethylene layer 13 to flow and encapsulate portions of the fabric 16 with weld points 13a so as to provide additional strength to the overall structure. Further heat or ultrasonic bonding with added molten low density polyethylene or ethylene vinyl acetate (EVA) form an additional layer 17 with the developed weld point 17a. The film laminate 10 can be bonded to the fabric 16 to form a laminated fabric for preparing garments. However, to maximize the impermeability of the garment against toxic vapors and substances, and to provide heat sealability to both sides of the garment, a further layer 17 is bonded to the film laminate 10 or another linear low density polyethylene film layer is bonded to the fabric 16. An adhesive bond provides greater flexibility than fusion bonding for this layer. However, there should be no seams in the outer shell which are adhesively bonded. Advantageously, the adhesive utilized for bonding to the outer fabric is fire resistant.

Figure 4:
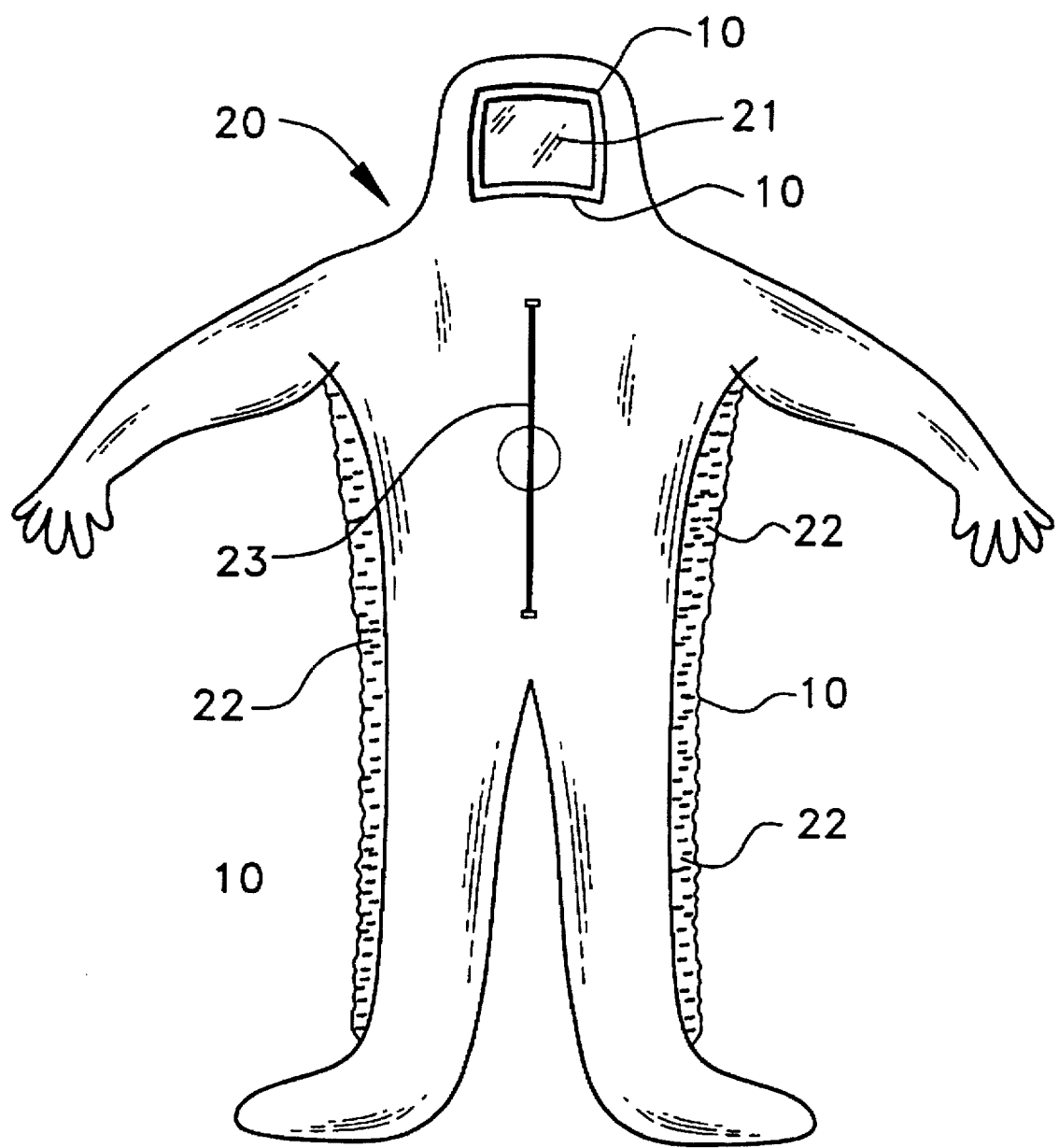
FIG. 4 illustrates a protective garment with the seal and fabric of the invention.

As illustrated in FIG. 4, a protective garment 20 is prepared from the fabric comprising films with outer layers of low density polyethylene. The garment 20 is provided with an optically transparent facepiece 21 and zipper strip 23. The facepiece 21 and zipper strip 23 can be formed from thick films similar to the film used in the interior of the garment 20. The facepiece 21 can also comprise a barrier film such as a Teflon (PFA, FEP), nylon, polyester, or an ionomer which is optically transparent and inert to many chemicals. Preferably, perfluoroalkoxy resin (PFA) or fluorinated ethylene polyethylene copolymer (FEP) is used. Suitable ionomers are described in U.S. Pat. No. 4,799,346, which is herein incorporated by reference.

The garment 20 is sealed with strips of the film laminate 10 or low density polyethylene along the seams, facepiece 21 and zipper strip 23. Embossment 22 of the strip 10 provides flexibility and strength to the seams. The entire laminated fabric can also be embossed to minimize wrinkling of the suit as well as provide enhanced flexibility and strength.

The thickness of the polyethylene films is generally in the range of about 0.8 to 1.0 mils. The total thickness of the film laminate 10 is generally about 2.0–3.0 mils.

The substrate fabrics 16 which are used in making the laminated fabric material are many and varied. They can be, but are not limited to cotton, KEVLAR, NOMEX, PBI (polybenzamidazole), rayon, wool, silk, polyester, nylon, polyethylene, polypropylene or other high tensile strength fibers. The fabrics weigh between one and four ounces per square yard, preferably in the one to the two ounce range.

The substrate fabric 16 includes plain and upstop weaves and knitted, non-woven, felted, spun bonded, melt spun or porous fabrics. Preferably, the fabric is nonwoven, spun-bonded and fire resistant. The fabric must provide high flexibility, tear strength and resistance to cracking and wrinkling. Moreover, it must prevent damage to the inner film layer in the event the outer film is punctured so as to prevent exposure by the wearer to toxic chemicals.

Alternatively, the fabric 16 can be bonded to the outer films by an adhesive, preferably a flexible adhesive. Preferable adhesive compositions include ethylene vinyl acetate (EVA), low melting polyolefins, urethanes, polyesters and ethylene acrylic ester copolymers such as described in U.S. Pat. No. 4,322,516, which is incorporated herein by reference. Pressure sensitive, thermoset and hot melt adhesives may be used. It is also desirable that this adhesive be fire resistant. It is critical that all outer seams are formed by fusion bonding.

The preferred polyamides of the present invention include poly(m-phenylene isophthalamide), poly(p-phenylene terephthalamide), poly(m-phenylene terephthalamide) and KEVLAR.

The preferred laminated fabric is the lowest cost, most flexible, lightest weight, disposable protective garment for chemical splash protection and most chemical vapors. It is unexpected that a 2.5 mils thick film of the preferred embodiment provides better chemical resistance than the known art Saranex 23-P (PVDC) films. This increase in chemical permeation barrier properties is even more pronounced when compared to the known art Tyvek QC (polyolefin) films. In fact, the preferred laminated fabrics are almost as good as the known art Barricade films which have an ethylene vinyl alcohol (EVOH) layer and are thicker than 2.5 mils.

Bonding a continuously formed laminate to a fabric gains the strength of the woven or non-woven fabric without interfering with barrier properties of the film. It enhances the resistance to flex cracking, wrinkles and failure from tearing and bursting to the total laminated fabric. Because of the absolute fail-safe requirements of chemical protective clothing and the need for easily putting the suit on or taking it off, an inner layer of film should also be used to form a sandwich with the fabric. This maximizes the flexibility of a given construction with the total plastic film barrier being split into two layers and being easier to flex than one thick layer.

Furthermore, it is critical in the invention that a linear low density polyethylene or other low melting copolymer such as ethylene vinyl acetate (EVA) be utilized since medium and high density polyethylenes do not possess the heat sealing features necessary for the invention. The sealing with the linear low density polyethylene can occur at lower temperatures than most plastics using heat and pressure or ultrasonic bonding.

A comparative study was performed to determine the breakthrough times and permeation rates of various chemicals for a 2.5 mils thick fabric material of the invention. The invention was compared to three types of film manufactured by Dupont in its Tychem Fabric Series, namely, Tyvek QC, Tyvek/Saranex 23-P and Barricade.

A chemical was placed on one side of the material and the vapor space on the opposite side of the material was periodically checked for the presence of the chemical vapor using gas chromatography. The time it takes to obtain a positive reading of the chemical in the vapor space constitutes the breakthrough time for that particular material.

As the following results show, the invention's material is vastly superior to Tyvek QC. Of the twenty chemicals tested, the invention's impermeability was superior to Tyvek on eighteen of them and the same on the remaining two.

Furthermore, the invention is superior to Tyvek/Saranex 23-P. The invention was much better than Saranex on eleven chemicals and the same on five more chemicals. Saranex was better on only four chemicals, and two of those (ethylene oxide and acetonitrile) showed only slight improvements.

Finally, the invention compared favorably to the high cost and thicker Barricade films. Barricade also employs an ethylene vinyl alcohol layer (EVOH). While Barricade showed better results on light chemicals, the invention matched Barricade's impermeability on ten chemicals and even outperformed it on one chemical (dimethylformamide). Barricade was not tested for dichloromethane. The following tests were performed pursuant to ASTM F1001 which is for the evaluation of protective clothing materials. The numbers reported are averages of samples tested by the ASTM F-739 test.

| NFPA CHEMICAL | PHYSICAL PHASE | BREAKTHROUGH TIME NORMALIZED (MIN) | PERMEATION RATE ($\mu g/cm^2/min$) | STANDARD DETECTION LIMIT (ppm) |
|---|---|---|---|---|
| | | DUPONT TYCHEM FABRIC TYVEK QC | | |
| Acetone | liq | immediate | 10 | 0.11 |
| Sulfuric Acid (conc) | liq | >480 | N/A | 1 |
| Sodium Hydroxide (50%) | liq | >480 | N/A | 1 |
| Acetonitrile | liq | immediate | 16 | 0.23 |
| Carbon Disulfide | liq | immediate | high | 0.11 |
| Hydrogen Chloride | gas | immediate | 9.3 | 0.4 |
| Chlorine | gas | immediate | >50 | 3 |
| Methyl Chloride | gas | immediate | 0.3 | 0.01 |
| Tetrachloroethylene | liq | immediate | 410 | 0.1 |
| Tetrahydrofuran | liq | immediate | 183 | 0.1 |
| Ethyl Acetate | liq | immediate | 12.7 | 0.11 |
| Diethylamine | liq | immediate | 64 | 0.02 |
| Toluene | liq | immediate | high | 0.03 |
| 1,3-Butadiene | gas | 8 | 12 | 0.01 |
| n-Hexane | liq | immediate | high | 0.05 |
| Methanol | liq | immediate | 2.2 | 0.18 |
| Nitrobenzene | liq | immediate | 18 | 0.01 |
| Dichloromethane | liq | immediate | >50 | 0.01 |
| Dimethylformamide | liq | 7 | 0.72 | 0.01 |
| Ethylene Oxide | liq | immediate | 168 | 0.07 |
| | | DUPONT TYCHEM FABRIC TYVEK/SARANEX 23-P | | |
| Acetone | liq | 24 | 1.6 | 0.1 |
| Sulfuric Acid (conc) | liq | >480 | N/A | 1 |
| Sodium Hydroxide (50%) | liq | >480 | N/A | 1 |
| Acetonitrile | liq | 13 | 2.8 | 0.01 |
| Carbon Disulfide | liq | 8 | >50 | 0.01 |
| Hydrogen Chloride | gas | >480 | N/A | 0.4 |
| Chlorine | gas | >480 | N/A | 12 |
| Methyl Chloride | gas | >480 | N/A | 0.15 |
| Tetrachloroethylene | liq | 8 | 5.7 | 0.01 |
| Tetrahydrofuran | liq | immediate | >50 | 0.01 |

-continued

| NFPA CHEMICAL | PHYSICAL PHASE | BREAKTHROUGH TIME NORMALIZED (MIN) | PERMEATION RATE (μg/cm²/min) | STANDARD DETECTION LIMIT (ppm) |
|---|---|---|---|---|
| Ethyl Acetate | liq | — | 6.6 | 0.8 |
| Diethylamine | liq | 12 | >50 | 0.02 |
| Toluene | liq | — | 30 | — |
| 1,3-Butadiene | gas | >480 | N/A | 0.01 |
| n-Hexane | liq | 146 | 0.48 | 0.03 |
| Methanol | liq | >480 | 0.6 | 0.01 |
| Nitrobenzene | liq | 102 | 2.3 | 0.03 |
| Dichloromethane | liq | 7 | >50 | — |
| Dimethyl formamide | liq | 113 | 0.4 | 0.01 |
| Ethylene Oxide | liq | 7 | 6.4 | 0.2 |

| DUPONT TYCHEM FABRIC BARRICADE | | | | |
|---|---|---|---|---|
| Acetone | liq | >480 | N/A | 0.1 |
| Sulfuric Acid (conc) | liq | >480 | N/A | 1 |
| Sodium Hydroxide (50%) | liq | >480 | N/A | 1.0 |
| Acetonitrile | liq | >480 | N/A | 0.04 |
| Carbon Disulfide | liq | >480 | N/A | 0.1 |
| Hydrogen Chloride | gas | >480 | N/A | 0.4 |
| Chlorine | gas | >480 | N/A | 4 |
| Methyl Chloride | gas | >480 | N/A | 0.02 |
| Tetrachloroethylene | liq | >480 | N/A | 0.2 |
| Tetrahydrofuran | liq | >480 | N/A | 0.4 |
| Ethyl Acetate | liq | >480 | N/A | 0.2 |
| Diethylamine | liq | >480 | N/A | 0.01 |
| Toluene | liq | >480 | N/A | 0.03 |
| 1,3-Butadiene | gas | >480 | N/A | 0.01 |
| n-Hexane | liq | >480 | N/A | 0.02 |
| Methanol | liq | 156 | 0.6 | 1 |
| Nitrobenzene | liq | >480 | N/A | 0.02 |
| Dichloromethane | liq | — | — | — |
| Dimethylformamide | liq | — | 1.7 | 1 |
| Ethylene Oxide | liq | >480 | N/A | 0.3 |

| FABRIC MATERIAL OF THIS INVENTION | | | | |
|---|---|---|---|---|
| Acetone | liq | 325 | 0.08 | 0.01 |
| Sulfuric Acid (conc) | liq | >480 | N/A | 1 |
| Sodium Hydroxide (50%) | liq | >480 | N/A | 1 |
| Acetonitrile | liq | 8 | 0.50 | 5.9 |
| Carbon Disulfide | liq | 21.3 | 0.42 | 0.01 |
| Hydrogen Chloride | gas | 70 | N/A | 1 |
| Chlorine | gas | >480 | N/A | 0.18 |
| Methyl Chloride | gas | >480 | N/A | 0.14 |
| Tetrachloroethylene | liq | >480 | 0.01 | 0.1 |
| Tetrahydrofuran | liq | 164 | 0.18 | 0.04 |
| Ethyl Acetate | liq | >480 | N/A | 0.01 |
| Diethylamine | liq | 452 | 0.10 | 0.02 |
| Toluene | liq | >480 | 0.01 | 0.01 |
| 1,3-Butadiene | gas | >480 | 0.04 | 0.01 |

-continued

| NFPA CHEMICAL | PHYSICAL PHASE | BREAKTHROUGH TIME NORMALIZED (MIN) | PERMEATION RATE ($\mu g/cm^2/min$) | STANDARD DETECTION LIMIT (ppm) |
|---|---|---|---|---|
| n-Hexane | liq | >480 | N/A | 0.01 |
| Methanol | liq | 9.3 | 1.1 | 0.16 |
| Nitrobenzene | liq | >480 | 0.05 | 0.07 |
| Dichloromethane | liq | 13 | 2.1 | 0.01 |
| Dimethylformamide | liq | >480 | 0.18 | 0.01 |
| Ethylene Oxide | liq | 4 | 4.8 | 1.1 |

Although the invention has been described with preferred embodiments, it is understood that variations and modifications may be employed without departing from the concept of the invention as defined in the following claims.

What is claimed:

1. A non-porous material for plastic fabrics and clothing having an inner and outer side which provides improved barrier protection comprising the combination of a fabric scrim on the innermost side and a coextruded film composition on the outermost side for providing said barrier, said coextruded film composition having a thickness of at least 2.0 mils which provides an outer non-porous barrier against solids, liquids and gases, said coextruded film composition consisting essentially of a coextrusion of a polyamide polymer film between layers of linear low density polyethylene, said material providing protection against dimethyl formamide when tested under the procedure of ASTM F1001.

2. The material of claim 1, wherein said fabric scrim is fusion bonded to said film composition.

3. The material of claim 1, wherein said polyamide film contains an adhesion layer on at least one side.

4. The material of claim 1, wherein said polyamide film contains a thin tie layer on at least one side.

5. The material of claim 1, wherein said scrim weighs between one and four ounces per square yard and comprises fibers selected from the group of fabrics consisting of nonwoven or woven polyester, polyamide, polyolefin, and mixtures thereof.

6. The material of claim 5, wherein said polyamide fabric is nylon.

7. The material of claim 1, wherein a hot melt polymer layer bonds said film to said scrim.

8. The material of claim 1, wherein an adhesive bonds said film to said scrim.

9. The material of claim 1, wherein said coextruded film is 2.0 to 3.0 mils in thickness.

10. The material of claim 1, wherein said fabric weighs about 1 to 2 ounces per square yard.

11. The material of claim 10, wherein said fabric is nonwoven.

12. The material of claim 10, wherein said fabric is spunbonded.

13. The material of claim 1, wherein said film is embossed.

14. The material of claim 1, wherein said linear low density polyethylene has a softening point of about 250°–350° F.

15. A garment fabricated in part with the material of claim 1.

16. The material of claim 1 including a second polyethylene film layer bond to said scrim.

* * * * *